Jan. 17, 1967  G. SCHWARTZMAN  3,298,502
DOUBLE END CONTACT LENS HOLDER AND MOISTENER
Filed Dec. 7, 1964  2 Sheets-Sheet 1
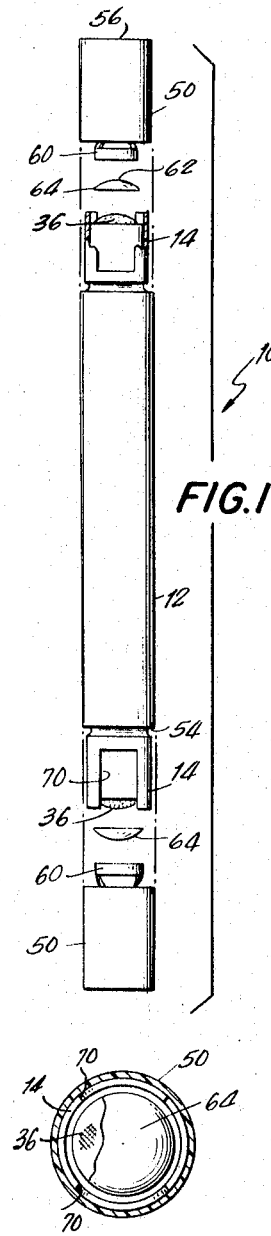
FIG.1
FIG.3
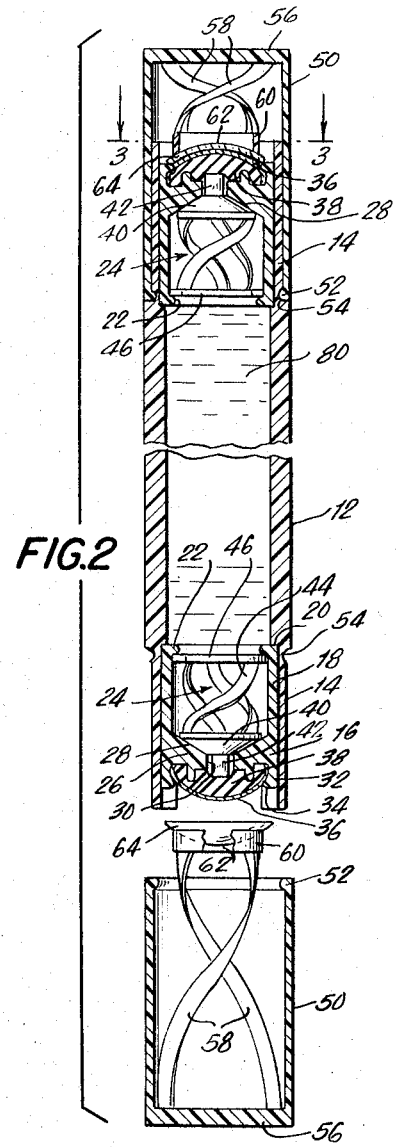
FIG.2
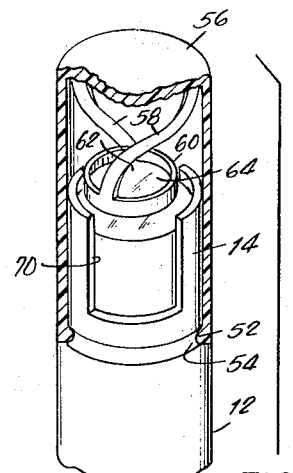
FIG. 4
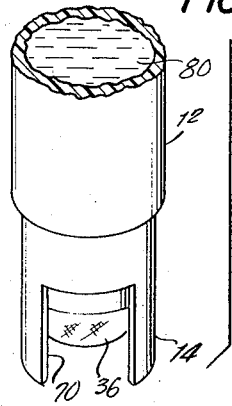
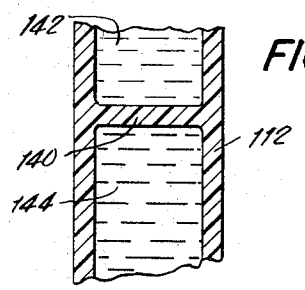
FIG. 5
INVENTOR.
GILBERT SCHWARTZMAN
BY
Briskin & Goldfarb
ATTORNEYS Jan. 17, 1967  G. SCHWARTZMAN  3,298,502
DOUBLE END CONTACT LENS HOLDER AND MOISTENER
Filed Dec. 7, 1964  2 Sheets-Sheet 2

INVENTOR.
GILBERT SCHWARTZMAN
BY
ATTORNEYS

3,298,502
DOUBLE END CONTACT LENS HOLDER AND MOISTENER
Gilbert Schwartzman, 20 Wilmot Circle, Scarsdale, N.Y. 10583
Filed Dec. 7, 1964, Ser. No. 416,351
8 Claims. (Cl. 206—5)

This invention relates to an ophthalmic instrument and more particularly to a contact lens holder and moistener.

Wearers of contact lenses often have occasions where they do not desire to wear the contact lenses, such as when relaxing, engaging in sports, travelling, or when doing labors not requiring special visual acuity. During these occasions, the wearer often removes the contact lenses. Heretofore various containers have been provided for safeguarding the contact lenses, but these containers had to be used in conjunction with a suitable apparatus for moistening the contact lenses before inserting them back into the eyes.

It is, therefore, the primary object of the present invention to provide a holder for contact lenses which will not only maintain and safeguard contact lenses, but which will automatically moisten the contact lenses for facilitating insertion thereof into the eyes of the user.

A further object of the invention resides in the provision of a contact lens holder which has means for automatically moistening contact lenses, yet which has valve means associated therewith which will prevent unnecessary loss of moistening fluid.

In carrying out the invention as an illustrative embodiment thereof, there is featured a contact lens holder in the form of a fluid container having opposed retaining rings inserted therein which are provided with openings therethrough. A valve assembly is associated with the retaining rings for controlling fluid flow. The valve assembly includes valve heads actuated by engagement with the contact lenses carried by the caps of the holder so as to assure proper moistening of the contact lenses, when they are securely in place and being safeguarded within the contact lens holder.

Still further objects and features of the contact lens holder reside in the provision of an ophthalmic instrument that is simple in construction, capable of being produced out of readily available materials, which is strong and durable, light in weight and very small, and which may be given wide distribution due to the low cost of manufacture.

These, together with the various ancillary objects and features of this invention, which will become apparent as the following description proceeds, are attained by this opthalmic device, preferred embodiments of which are illustrated in the accompanying drawings, by way of example only, wherein:

FIG. 1 is an exploded elevational view of an ophthalmic instrument constructed in accordance with the concepts of the present invention;

FIG. 2 is an exploded longitudinal sectional view of the contact lens holder;

FIG. 3 is a transverse sectional view taken along the plane of line 3—3 in FIG. 2;

FIG. 4 is an exploded partial perspective view of the contact lens holder illustrating the manner in which a lens is supported in the invention;

FIG. 5 is a partial longitudinal sectional detail view illustrating a modification of the invention;

Figure 6:
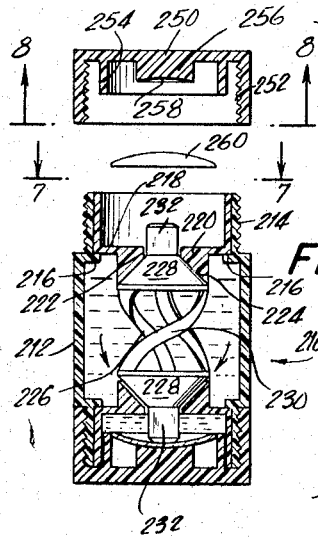
FIG. 6 is an exploded longitudinal sectional view of another form of the invention.
Figure 7:
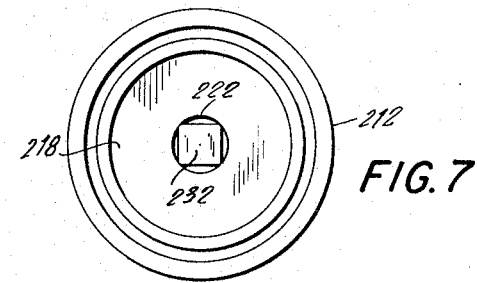
FIG. 7 is a plan view looking along the plane of line 7—7 in FIG. 6.
Figure 8:
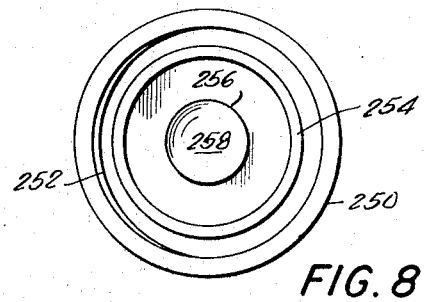
FIG. 8 is a plan view of the cap looking along the plane of line 8—8 in FIG. 6.
Figure 9:
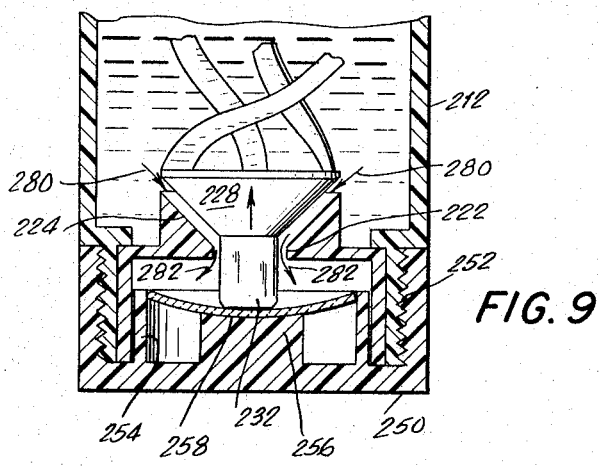
FIG. 9 is an enlarged sectional detail view illustrating the manner in which fluid is applied on the inner concave surface of a lens, while the lens is being carried.

With continuous reference to the accompanying drawings wherein like reference numerals designate similar parts throughout the various views, and with initial attention directed to the embodiment of the invention as shown in FIGS. 1 through 4, reference numeral 10 is used to generally designate an ophthalmic instrument constructed in accordance with the concepts of the present invention. This instrument 10 includes a container 12 preferably molded from either an opaque, translucent, or transparent synthetic plastic material, such as polystyrene, polyvinyl chloride, polyethylene, nylon or the like, and which container is preferably cylindrical in shape and which has a pair of restricted neck portions 14.

Disposed in the neck portions 14 are retainer rings 16 having projected portions 18, which extend into the neck portions 14 and which are adapted to seat against the shoulders 20 formed in the neck portions 14. The inner ends of the projecting portions 18 are swaged as at 22 to retain valve assemblies 24 within the retaining rings.

The retaining rings 16 are each provided with a web 26 having an inner tapered surface 28 and an aperture 30 therethrough. The retaining rings are each provided with a flange 32 having a swaged end 34 for holding a cover 36 in place. A compressed body of foam rubber 38 or the like is disposed between each cover 36 and each web 26. Each valve assembly 24 includes a tapered valve body 40 and a valve head 42 which extends through an opening 30. Helical coils 44 of polyethylene or like material integrally formed with a ring 46 and the valve head 40 and extending therebetween are maintained in a compressed state and normally urge the valve body 40 against the wall 26 of the web 26 for preventing fluid flow. However, when the cover 36 is sufficiently depressed, the valve body 40 will be moved out of contact with the valve seat 28 allowing fluid flow into the foam rubber body 38 and onto the cover 36. The cover is preferably formed out of a flexible two-ply material including an upper layer of nylon kitted brushed fabric and a lower layer of coarse polyethylene foam bonded to the upper layer to form a two-ply laminated material.

Caps 50 are provided for each of the ends of the container 12 and these caps are generally cylindrical in shape having ribbed end portions 52 for locking in grooves 54 provided on the container 12. The ends 56 of the caps have integrally formed therewith helical coils 58 which form spring means for holding contact lens supporting members 60 outwardly of the caps. The supporting members 60 are disc-shaped and are concave as at 62 and adapted to receive contact lenses 64 therein so that the concave inner surface of each lens is held in tight engagement with the respective cover 36 so that fluid passing onto each cover 36 will moisten the inner surface and substantially all of the contact lens for facilitating the application of the contact lens. Since the coils 58 hold the contact lens outwardly of the caps, there is formed an instrument helpful in inserting contact lenses.

As can be readily seen in FIG. 4, each of the neck portions 14 are provided with enlarged slots 70 therein for facilitating access to the contact lenses 62 should they remain in engagement with the cover 36.

In use, with suitable moistening fluid 80 within the container, the lenses are placed on the disc-shaped supporting members 60 and then the caps 50 are secured to the container 12. This will cause the valve body 40 to be depressed sufficiently to allow fluid flow through the openings 30 and onto the covers 36 to allow continuous moistening of the lenses to prevent any possible abrasion thereof while also maintaining them instantaneously and continuously moist ready for application and insertion by the wearer.

Referring now to the embodiment of FIG. 5, it is conceivable that separate moistening prescriptions will be desired for the different eyes of the user. Hence, it is possible to provide a container 112 having a partition 140 which separates the interior of the container 12 into two separate chambers 142 and 144 for receiving different types of fluid according to the needs of the user.

The embodiment of FIGS. 6 through 9 is somewhat different in construction from the ophthalmic instrument previously described. In this form of the invention the contact lens holder 210 includes a container 212 formed from any suitable plastic material and having a pair of neck portions 214 on the opposed ends thereof. The neck portions 214 may be threaded or provided with any other suitable closure such as the snap closure means previously described. Received in the neck portions 214 and abutting against shoulders 216 are retaining rings 218 having the webs 220 provided with openings 222 therein. The webs have tapered walls 224.

A single valve assembly 226 is provided which includes a pair of valve bodies 228 interconnected by helical coils 230 formed of polyethylene or like material, the valve bodies including valve heads 232 which extend through the openings 222 and therebeyond, with the valve bodies adapted to close the openings by bearing engagement with the tapered truncated conical walls 224 of the web portion 220 which form valve seats. The spring-like helical coils 220 are continuously under compression and continuously urge the valve body 228 to a closed position.

A pair of caps 250 of similar construction are provided for threaded engagement with the threaded neck portions 214. These caps are provided with internal threads 252 for threaded engagement with the threads 214 and also provided with peripheral inner flanges 254 which are adapted to cooperate in conjunction with projections 256 having concave surfaces 258 in receiving contact lenses 260. The contact lenses rest in the concavities 258 of the projections 256 and on the flanges 254 in the manner shown in FIG. 9 with the valve heads pressing down against the interior of the concave surfaces of the lens once the cap has been inserted in place. This will serve to depress the respective valve head allowing fluid to flow in the direction of arrows as at 280 and 282, FIG. 9, continuously moistening the contact lens and providing a body of fluid in contact with the contact lens for maintaining it continuously moist. Of course, when it is desired to insert a lens, the ophthalmic instrument is held substantially vertical and the cap in the uppermost position is removed first. During this removal, fluid will flow back into the container, through the open valve, and the moist lens will be easily accessible since it will rest on the valve head 232 and may be easily removed for application and insertion into the wearer's eyes.

As can be seen best in FIG. 6, the valve heads 232 are of a rectangular cross section so as to always permit fluid flow past the valve heads, so that the valve heads do not provide any constriction against fluid flow, but only each valve body in engagement with the respective valve seat will provide a seal.

A latitude of modification, substitution and change is intended in the foregoing disclosure, and in some instances, some features of the invention will be employed without a corresponding use of other features. Accordingly, it is appropriate that the appended claims be construed broadly and in a manner consistent with the spirit and scope of the invention herein.

I claim:
1. A contact lens holder comprising a fluid container having a neck portion, a retainer ring inserted in said neck portion, a flexible cover secured to said ring, said ring having an opening therein forming a valve seat, a valve assembly including a valve head movable with respect to said valve seat to control fluid flow through said opening, said valve assembly including spring means integrally formed with said valve head, said spring means urging said valve head against said valve seat and through said opening, a cap detachably secured to said neck portion, and supporting means for a contact lens disposed in said cap, said cover being depressible to depress said valve head.

2. A lens holder according to claim 1, wherein said supporting means includes a concave disc-shaped support member, and helical coils integral with said member and said cap for pressing said support member towards said retainer ring.

3. A contact lens holder comprising a fluid container having a neck portion, a retainer ring inserted in said neck portion, a cover secured to said ring, said ring having an opening therein forming a valve seat, a valve assembly including a valve head movable with respect to said valve seat to control fluid flow through said opening, said valve assembly including spring means integrally formed with said valve head, said spring means urging said valve head against said valve seat and through said opening, a cap detachably secured to said neck portion, supporting means for a contact lens disposed in said cap, and a resilient porous body disposed between said cover and said valve seat, said body being deformable so that said cover may be depressed urging a portion of said body toward said opening to depress said valve head away from said valve seat against the forces exerted by said spring means.

4. A fluid applicator according to claim 3, wherein said spring means include helical coils of polyethylene, said body being formed of coarse polyurethane foam.

5. A lens holder according to claim 4 wherein said cover is of a two-ply laminated material including an upper layer of nylon knitted brushed fabric and a lower layer of coarse polyurethane foam bonded to said upper layer.

6. An ophthalmic instrument comprising a fluid container having opposed neck portions, a retainer ring secured in each of said neck portions, said rings having openings therein forming valve seats, a valve assembly including a pair of opposed valve heads movable with respect to said valve seats to control fluid flow through each of said openings, said valve assembly including spring means integrally formed with said valve heads and extending therebetween, said spring means urging said valve heads against said valve seats and through said openings, caps detachably secured to said neck portions, and supporting means for contact lenses disposed in said caps.

7. A contact lens holder comprising a fluid container having opposed neck portions, retainer rings inserted in said neck portions, covers secured to said rings, said rings having openings therein forming valve seats, valve assemblies each including a valve head movable with respect to one of said valve seats to control fluid flow through said openings, said valve assemblies including spring means integrally formed with said valve heads, said spring means urging said valve heads against said valve seats and through said openings, caps detachably secured to said neck portions, supporting means for contact lenses disposed in said caps, said supporting means including concave support members, and helical coils integral with said members and said caps, and resilient porous bodies disposed between said covers and said valve seats.

8. A lens holder according to claim 7 including a partition in said container dividing said container into two chambers.

References Cited by the Examiner

UNITED STATES PATENTS 3,101,087  8/1963  Watson _____ 206—5

FOREIGN PATENTS 562,398  5/1957  Italy.

THERON E. CONDON, *Primary Examiner.*

WILLIAM T. DIXSON, JR., *Examiner.*